UNITED STATES PATENT OFFICE.

THOMAS BAILEY WALKER, OF AUSTIN, TEXAS.

PROCESS OF MAKING FOOD PRODUCTS.

1,206,954. Specification of Letters Patent. Patented Dec. 5, 1916.

No Drawing. Application filed December 16, 1914. Serial No. 877,584.

*To all whom it may concern:*

Be it known that I, THOMAS BAILEY WALKER, a citizen of the United States of America, and a resident of Austin, Texas, have invented a new and useful Improvement in Processes of Making Food Products, which invention is fully set forth in the following specification.

This invention relates to a process of making edible products from oils, fats or the like, and partially hydrogenized compounds of the same, and has for its object to produce a product of the kind referred to which will simulate a desired consistency, such as that of lard, butter or other fatty edible product, while securing the flavor characteristic of such compound.

Heretofore, oils, fats and the like, either alone or mixed, have been hydrogenized, either partly or completely, for the purpose of giving them the consistency of lard or butter, but in practice it has been found that when so treated the product loses the flavor of the dominating ingredient and does not possess the palatability desired.

My invention overcomes the above objection and enables me to make lard and butter substitutes, and other edible fatty products possessing the desired consistency and flavor, and resides in providing a process which, broadly stated, consists in partially hydrogenizing unsaturated compounds of oils, fats or the like, such as compounds of vegetable or animal oils and fats, by any well known method and arresting the operation at a predetermined point short of saturation and where the consistency of the product is above or below that of a given oil or fatty body, and then incorporating with the partially hydrogenized body an unhydrogenized oil or fatty body to produce a product of the desired consistency and having the characteristic flavor desired.

By way of example, I give an application of my process to the preparation of a lard substitute.

Purified cotton-seed oil is subjected to hydrogenization until the action reaches a point where the stearin produced amounts to about twenty-two per cent. of the oil treated, there remaining about eighty per cent. of unsaturated oil. These proportions may vary with wide limits, depending on the consistency of the final product desired and the nature of the subsequent additions. To the hydrogenized product freed from catalyzer, if a solid catalyzing agent has been used, oily lard is added, preferably by means of incorporating rolls, the quantity being sufficient to give to the hydrogenized product a lard consistency. This product has all the desired characteristics of a lard substitute, including the desirable lard flavor.

My process is equally applicable to making butter substitutes, the manufacture of coatings for chocolate creams, confections and the like.

In carrying out my process, it is important that the hydrogenizing action be carried to a point affording a consistency above or below that of the final product, and then secure the desired consistency by incorporation of a suitable oil or solid fatty body, thereby securing the benefits of the added body as a hardening or softening agent while retaining its desirable flavoring characteristics unimpaired. I have found, in general, that the hydrogenizing action, for the purposes of my process, may vary between a product which is soft and greasy to a solid, but for the preparation of lard and butter substitutes the hydrogenizing action should produce a product containing about eighteen to twenty-two per cent. of stearin.

What is claimed is:—

1. The process consisting in subjecting an edible fatty material to hydrogenization to produce a product containing stearin amounting to about twenty-two per cent. of the material treated and then incorporating therewith a different edible fatty material to impart to the product a consistency and flavor simulating that of a predetermined natural edible fat.

2. The process consisting in subjecting cotton-seed oil to hydrogenization to produce a product containing about twenty-two per cent. stearin and incorporating therewith oily lard in quantity sufficient to simulate natural lard in consistency and flavor.

3. An edible fatty food product simulating in consistency and flavor a natural fatty food product consisting of hydrogenized fatty material containing about twenty-two per cent. of stearin and an unhydrogenized and different fatty edible material for imparting to the product the consistency and flavor characteristic of the simulated product.

4. An edible fatty product simulating natural lard comprising hydrogenized cotton-seed oil containing about twenty-two per cent. of stearin and oily lard in quantity sufficient to impart to the product the consistency and flavor of natural lard.

In testimony whereof I have signed this specification in the presence of two subscribing witnesses.

THOMAS BAILEY WALKER.

Witnesses:
 FREDERICK A. HOLLIS,
 I. B. WEGENAST.